United States Patent

Allen

[11] 4,131,596
[45] Dec. 26, 1978

[54] SENSING SYSTEM AND METHOD FOR PLASTIC INJECTION MOLDING

[75] Inventor: Paul E. Allen, Newtown, Conn.

[73] Assignee: Logic Devices, Inc., Sandy Hook, Conn.

[21] Appl. No.: 826,494

[22] Filed: Aug. 22, 1977

[51] Int. Cl.² .............................................. B29F 1/06
[52] U.S. Cl. ................................. 264/40.5; 264/328; 425/149; 425/150
[58] Field of Search ............... 425/145, 147, 149, 150, 425/140, 141; 264/40.4, 40.5, 40.1, 328; 164/153, 154

[56] References Cited

U.S. PATENT DOCUMENTS

| | | | |
|---|---|---|---|
| 2,433,132 | 12/1947 | Lester | 164/153 X |
| 2,671,247 | 3/1954 | Lester | 425/149 |
| 3,667,884 | 6/1972 | Reinfeld | 425/574 X |
| 3,773,451 | 11/1973 | Bielfeldt et al. | 425/147 |
| 3,976,415 | 8/1976 | Hauser et al. | 425/147 X |

FOREIGN PATENT DOCUMENTS

| | | | |
|---|---|---|---|
| 1233579 | 2/1967 | Fed. Rep. of Germany | 264/40.1 |
| 2050804 | 3/1971 | France | 264/40.1 |
| 563568 | 6/1975 | Switzerland | 425/149 |

Primary Examiner—William R. Briggs
Attorney, Agent, or Firm—Ernest M. Junkins

[57] ABSTRACT

An apparatus and method for providing a signal that measures the extent of the separation of injection mold dies during the injection of plastic material into the mold cavity and uses this signal to reduce the possibility of flash damage to the mold dies by decreasing the pressure clamping the molds together if the separation exceeds a value that is known to cause flash and/or further utilizes the signal to alter the rate of injection of plastic material.

5 Claims, 5 Drawing Figures

SENSING SYSTEM AND METHOD FOR PLASTIC INJECTION MOLDING

The present invention relates to the art of plastic injection molding, wherein at least two mold dies are forced together by a high clamp pressure to define a closed mold cavity. Plastic material is then injected into the mold, under pressure, and this pressure exerts a force which tries to open the mold dies in opposition to the high clamp pressure force holding the dies closed. Generally, this plastic injection force is sufficient to cause the mold dies to become at least slightly separated with the separation occurring while the plastic material is still flowable. If the separation becomes sufficiently large, portions of the plastic material will flow into the opened parting lines of the mold dies surrounding the mold cavity. Such portions are generally referred to as "flash" and are generally undesirable in the finished article.

In heretofore injection molding techniques, the high clamp pressure force is maintained throughout the first stage of the plastic material injection that essentially fills the mold cavity with the plastic material and the subsequent filling that fills any voids in the cavity that remains as the plastic material shrinks and hardens. If the parting lines are sufficiently separated, the plastic material will flow into the separation and become the portion of the plastic material that is first to harden. As the remainder of the plastic material cools, hardens and shrinks, the force of the injected plastic material tending to open the dies decreases. However as the high pressure clamp force is still effective, and is no longer being opposed by the plastic injection opening force, a greater force is thus applied to close the separated dies.

As the dies are being increasingly forced together, if there is flash present in the parting lines, the entire closing force becomes exerted on the flash and hence on the parting lines because the flash prevents complete closing of the dies. As such operations are repeated, the parting lines will loose their sharpness, enabling larger flash to occur, which in turn, further deteriorates the parting lines' edges. The mold thus becomes incapable of forming satisfactory parts because the flash becomes too objectionable.

Further in some heretofore known injection systems, the change from first stage injection to the lesser pressure, lower, volume subsequent stage injection has been controlled by sensing the pressure of the plastic material in the mold cavity by the use of pressure transducers communicating with the mold cavity. While such devices have been found operable, they are somewhat expensive, each mold may require one or more thereof, and skill is required in selecting the location in the mold for placement of pressure transducers in order to assure that an accurate measurement of the pressure exerted by the plastic material is provided.

It is an object of the present invention to provide a system and method for providing signals indicative of instantaneously occurring conditions that occur in injection molding cycles that may be used to control subsequent operations in the cycle.

Another object of the present invention is to achieve the above object and utilize the signal to reduce flash deterioration of a mold die if conditions causing such a possibility may occur while permitting the plastic molding cycle to normally continue if flash deterioration is not apt to occur.

A further object of the present invention is to provide a system and method for providing a signal by sensing the extent of separation of mold dies and using the signal to control the change in the rate of injection of plastic material into a mold cavity.

Still another object of the present invention is to achieve the above objects with a system that is readily incorporable in presently existing plastic injection molding machines, that is relatively economical to manufacture and which is easily adapted to the molding of different articles by different molds.

In carrying out the present invention, there is to provide a typical molding machine which has a stationary mold die support plate and a movable die support plate with a mold die being mounted on each plate. The movable plate is supported for reciprocating movement toward the stationary plate to effect closure of the mold dies and movement away therefrom to effect opening of the dies. The plate movement is produced by controlling fluid pressure to a hydraulic ram.

The present invention requires the measuring of the extent of separation of the two dies that occurs during the injection molding cycle. As the two dies are forced together hydraulically and as the injection of the plastic material produces a force tending to open the dies, the present system has a position sensor mounted to measure the extent of the separation. I have found that the ability to predict whether or not flash is apt to cause mold die damage can be predicted on the extent of the separation of the mold dies during the plastic material injection step. When the signal provided by the position sensor indicates that an extent of separation is occurring that is insufficient to cause flash, then the molding cycle is permitted to proceed normally. However, if the separation becomes great enough to cause flash, the signal is utilized to reduce the fluid pressure to the hydraulic ram to reduce the clamping force which in turn reduces the force exerted on the hardened flash between the parting lines. The cycle then continues with the dies only being held together by the lesser clamping force, which force is insufficient to cause deterioration of the parting lines of the mold dies by the hardened flash.

In addition to reducing the possibility of flash damage, the extent of the separation has been found to be directly related to the pressure of the plastic material in the mold cavity. Thus the extent of the separation signal may be employed in place of signals produced by heretofore known pressure transducers to control the flow of plastic material in addition to or independently of the use of the separation signal for minimizing flash damage.

Other features and advantages will hereinafter appear.

In the drawing

Figure 1:
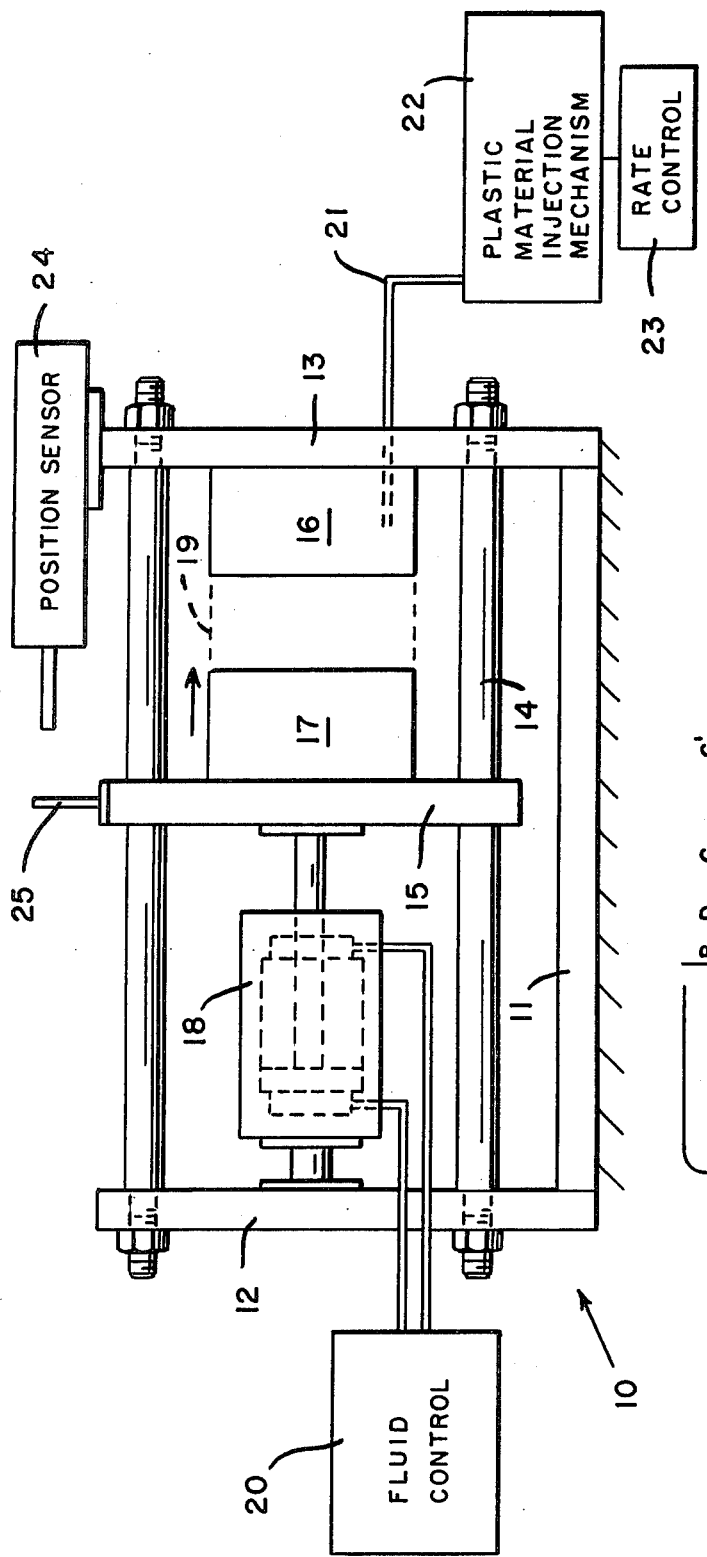
FIG. 1 is a sketch of a plastic molding machine having the present invention incorporated therein.

Referring to the drawing, a plastic injection molding machine is generally indicated by the reference numeral 10 and includes a base 11 having at one end an upright 12 and at the other end a stationary mold die support plate 13. Tie-rods 14 maintain the upright 12 and plate 13 in spaced relation and also serve to support a movable die support plate 15. One half of a mold die 16 is mounted on the stationary plate 13, while it's mating other half 17 is mounted on the movable plate 15 in alignment therewith.

The movable support plate 15, and hence mold die 17, are connected to a hydraulic ram 18 which is also connected to the upright 12, for moving the mold die 17 between an open, solid line position shown and a closed position indicated by dotted lines 19. As indicated, there is provided a fluid control block, generally indicated by the reference numeral 20, for supplying hydraulic fluid to the hydraulic ram 18 to thereby control both it's movement and the force that the ram exerts.

Also shown diagrammatically is a passageway 21 to the stationary mold die 16, by which plastic material may be injected as indicated by a plastic material injection mechanism 22 into a mold cavity (not shown) formed by the closed two dies with the rate and pressure of the plastic material injection being regulated by a rate control 23.

The above-described typical plastic injection molding machine has added thereto in order to achieve the objects of the present invention, a position sensor 24 and an actuator 25. The position sensor provides a continuous signal of the distance between it and an actuator 25. Thus the sensor 24 may be mounted on one mold die with the actuator 25 mounted on the other mold die. Preferably, however, they are mounted on the machine 10 with the sensor 24 being secured on the stationary support plate 13 while the actuator 25 is carried with the movable plate 15. In this manner, the mold dies may be changed without changing the sensor and actuator.

The above described molding machine typically cycles by having the fluid control 20 supply to the hydraulic ram 18, when the molding cycle is initiated and the mold dies are open, a low mold pressure which causes movement of the mold die 17 towards the mold die 16 to the almost closed, dotted line position 19. On achieving this position, without obstruction, the fluid control then applies to the ram 18, fluid under high pressure, generally termed "high clamp pressure", to provide a large force that forces the mold dies together and which generally includes a slight additional closing movement from the low mold position. The high clamp pressure is maintained while the rate control 23 directs the injection of plastic material by the mechanism 22 into the mold cavity formed between the two closed dies.

After the desired amount of material has been injected into the mold die cavity at a rate and pressure set by the rate control to cause satisfactory filling of the cavity, the high clamp pressure is reduced to what is termed, a "low clamp pressure", by the fluid control shifting to a lower pressure of the hydraulic fluid. The low clamp pressure is maintained during the hardening of the plastic material in the cavity and then the fluid control 20 applies fluid pressure to the ram 18 to cause the reverse, opening movement of the mold dies. It should be noted that in heretofore known molding machines, the high clamp pressure is almost, if not always, continuously maintained while plastic material is being injected into the mold cavity.

Figure 2:
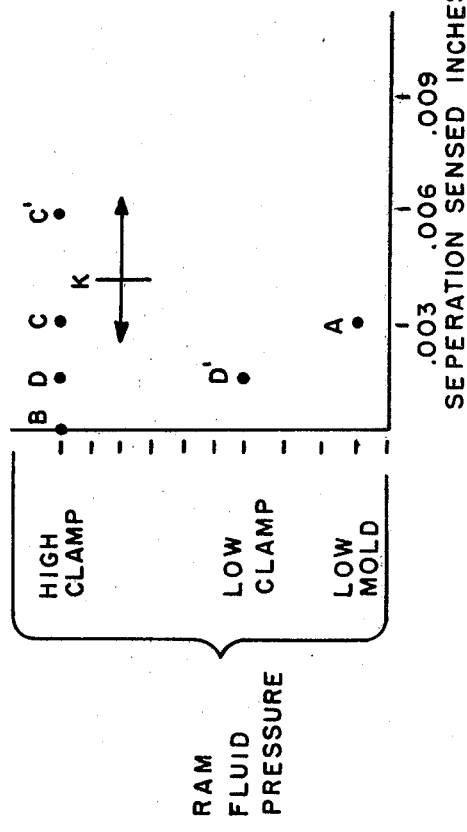
FIG. 2 is a diagrammatic representation of relative ram pressures and separation extents.
Figure 3:
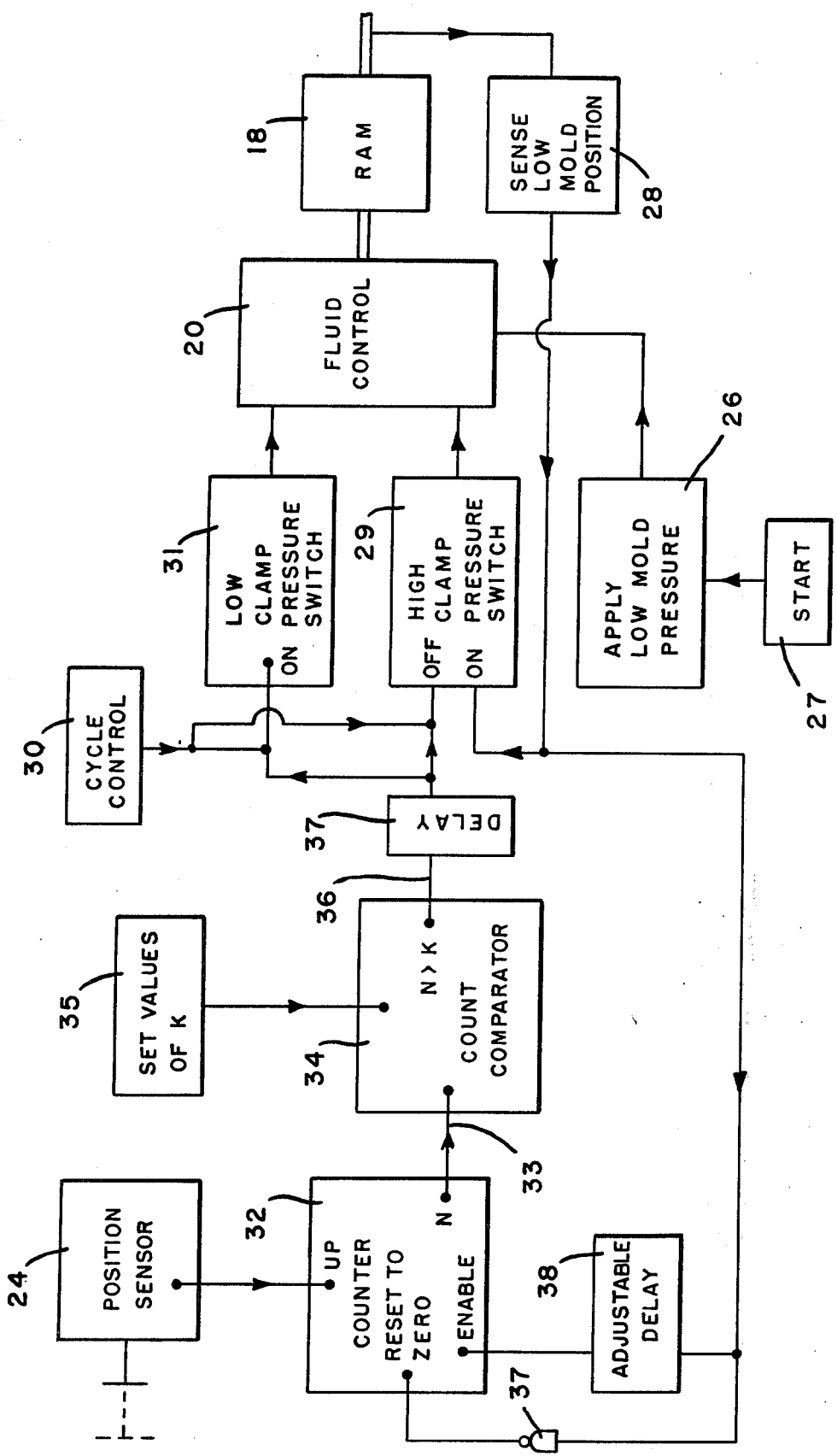
FIG. 3 is a block diagram of a control scheme which incorporates the present invention for reducing flash damage.

Shown in FIG. 3 is a blocked diagram of selected components of the typical molding machine having the apparatus of the present invention. The fluid control 20 is indicated and is shown connected to the ram 18. A block 26 connected to a cycle start block 27 causes the fluid control 20 to apply the low mold pressure to the ram 18, which causes the mold die 17 to move toward the mold die 16 and if no obstructions are sensed, a sense low mold position 28 provides a signal that the mold die 17 has reached the low mold position. Referring to FIG. 2 there is shown a representation of the ram pressure versus the separation sensed in inches and the point A is utilized to indicate the typical separation of the two mold dies after the low mold pressure position has been achieved. Upon obtaining the point A, the system causes a high clamp pressure switch 29 to be operated which applies the high clamp pressure from the fluid control to the ram 18. The high clamp pressure will cause the mold dies to close and essentially obtain a zero position as indicated by the point B in FIG. 2. The high clamp pressure is maintained and plastic material is injected by the mechanism 22 under the rate control 23, and in doing so, will cause a separation of the dies so that, for example, the point C may occur wherein the dies are slightly opened even though high clamp pressure is maintained.

The cycle continues with the cooling of the plastic material, its subsequent shrinkage, further or continuous injection of plastic material, which may be at a different rate and pressure than the previously injected plastic material and the dies become closer together as indicated by the point D in FIG. 2. Upon completion of the injection of the plastic material, a cycle control indicated by the reference numeral 30, causes a low clamp pressure switch 31 to be operated which applies hydraulic fluid at a lower pressure to the ram 18 while shutting off the high clamp pressure switch 29. The low clamp pressure switch is maintained until sufficient cooling has occured, at which time the cycle control causes the mold die 17 to revert to its open position with the plastic part being ejected.

While the above cycle is that which is typically performed during a molding operation, in accordance with the present invention, the position sensor 24 provides a signal when the dies have separated from the point B to a point C' which is beyond a separation distance indicated by the reference character K in FIG. 2. If such an event occurs, as typified by the point C' in FIG. 2, then the system automatically causes the low clamp pressure to be applied and thus, as the cycle progresses, the low clamp pressure would cause the dies to revert back to, perhaps, a point D'. The cycle then further continues as formerly, in that the cycle control 30 then stops the low clamp pressure and enables opening of the dies.

In FIG. 3, one example of a structure for determining if the value of K has been exceeded includes the position sensor 24 which may be a digital linear encoder capable of sensing distance at least in thousandths of an inch increments and providing a pulse for each increment with its pulse output being connected to an up terminal of a counter 32 whose count is supplied on lead 33 to a count comparator 34. The value of K, expressed as digital increments of the position sensor is introduced to the comparator from a block 35 and when the value of counter exceeds the value of K, a signal is passed on a lead 36 to an off terminal of the high clamp pressure switch 29 and to an on terminal of the low clamp pressure switch 31. Accordingly, as soon as the value of K is exceeded, a signal is provided by the system.

In many instances, it may be desired to provide a delay, as indicated by a block 37 in the lead 36 in order that, even though the K separation is exceeded, the point C' can be reached so that high clamp pressure is maintained during most of the time that plastic material is being injected into the mold. However, said delay 37 should effect shifting from the high clamp pressure to the low clamp pressure before the high clamp pressure has forced closure of the dies to a position where the hardened flash would begin to be crushed by the parting lines of the mold dies.

It should be noted that the value of K is capable of being adjusted by the block 35 so that the system may be adjusted for a separation value unique to each set of mold dies and/or molding machines and/or plastic material. One manner of determining the value of K is to operate a cycle with a low value of K and keep increasing the value of K for each subsequent cycle until minute flash starts to form. K may have a value from 0.003 to 0.010 inches with it being generally desired to have it as large as possible so as to produce as many normal cycles as possible. Each time the value of K is exceeded, an unsatisfactory part is usually produced.

In order to determine the point B, from which the dies separation is measured with point B being representative of the closest that the mold dies are together, the counter 32 has a reset to zero terminal connected through an inverting gate 37 to the signal produced by the sense low mold position block 26. Thus, the counter is maintained reset at zero except when the low mold position has been attained. The sensor 24 is connected to only provide digital output pulses when the actuator 25 is moving in a separation direction. It is also noted that another adjustable delay 38 is connected to the enable terminal of the counter and the low mold position sense block 28 to enable the counter count to be changed only after a selectable duration after the high clamp pressure has been applied. The duration is selected so that the high clamp pressure has been applied for a sufficient time, but yet there has been insufficient injection of plastic material to effect a force which would tend to separate the dies.

In the operation of a cycle, the start switch 27 is actuated, the low mold position reached, the counter reset to zero signal removed, the high mold pressure applied and the delay 38 initiated. Plastic material is injected, the delay 38 expires, the dies move to separate and the counter begins to count the extent of the separation. If the value of K is exceeded then the pressure is shifted to the low clamp pressure, which if not exceeded, the system continues its normal cycle with the assurance that flash is not being produced which could cause deterioration of the mold die parting lines.

The rate control 23 and injection mechanism 22 may be any one of a plurality of commercially available devices with one type being a Barber-Coleman, Rockford, Illinois, injection molding process controller, Model 910. These controllers initially inject plastic material at a high volume, low pressure to quickly essentially fill the cavity while creating only slight cavity pressure and hence mold dies opening force. The process then performs a mold packing operation which injects a small volume of plastic material at a high pressure with the latter producing a high mold die opening force. The delay 38 may be set to operate at a time in the filling operation in order to measure separation that occurs during mold packing and thus the present invention need not measure from its most closed position of the mold dies so long as such a base position remains constant for many cycles. Further, the delay 37 may be set to operate after the mold packing operation in order to, at least, have the high closing force be exerted during the packing operation but yet effect a shift to the low clamping pressure after the packing operation but before the separation becomes so reduced as to cause compression of the flash.

The above listed rate control 23 and injection mechanism 24 generally utilizes a pressure transducer to provide a signal for indicating the pressure of the plastic material in the mold cavity. Such a device has heretofore conventionally been located in the plastic material passageway or runner or else located to be actuated by an injector or dummy pin in at least one of the mold cavities. The pressure transducer generally provides an analog signal related to the pressure, generally of a selected value thereof which is used to control shifting of the injection mechanism 22 from its primary filling pressure to its secondary packing pressure.

Figure 4:
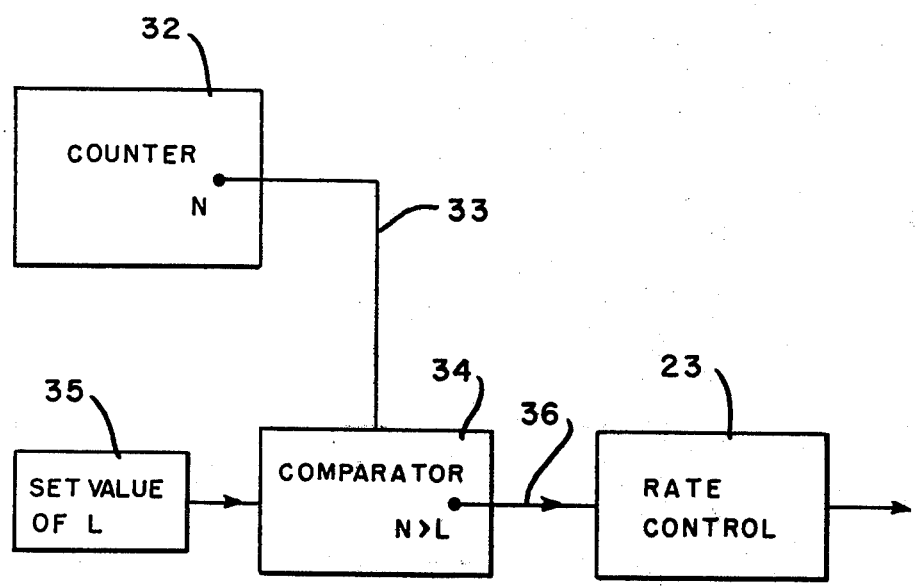
FIG. 4 is a block diagram of a control scheme which may be used to provide a signal for controlling the change in the rate of injection of plastic material.
Figure 5:
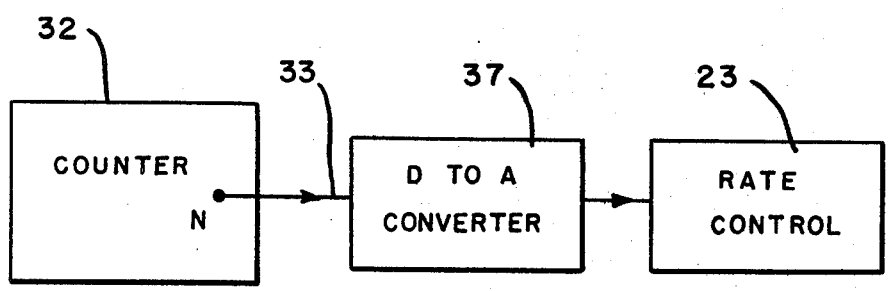
FIG. 5 is an alternative embodiment of the system of FIG. 4.

In place of using pressure transducers, the rate control 23 may receive a signal of the pressure of the plastic material in the mold cavity from the counter 32 connected to the position sensor 24. Thus as shown in FIG. 4, the instantaneous count terminal (n) of the counter 32 is connected to a comparator 34 which also receives from a block 35, a value of L that is selectable. When the value of N becomes greater than that of L, a binary signal is produced on a lead 36 to the rate control 23. On the other hand, if the rate control 23 requires an analog voltage signal, the circuit shown in FIG. 5 may be employed in which there is a digital to analog converter 37 that receives the count of the counter 32 on the lead 33 and converts it into an analog voltage. The rate control may use such a signal if the same manner that the pressure transducers analog voltage signal is employed. The phrase altering the rate of injection of plastic material as used herein includes altering the quantity of flow of plastic material and/or altering the pressure of the plastic material.

One form of position sensor 24 that may be employed is obtainable from Dynamics Research Corp, Wilmington, Mass., and identified as linear transducer LMT500 with a counter/comparator being a digital readout DCR100/500.

It is also noted that other types of rate control and injection mechanisms may be used with the present invention such as a Model 308-2 adaptive shot control system from Hunkar Laboratories, Inc., Cincinnati, Ohio 45244, whose literature cites U.S. Pat. No. 3,767,399; or an injection ram controller available from Moog, Inc., East Aurora, New York 14052.

One type of molding machine having different clamp pressures and cycle control is available from HPM Corp., Mount Gilead, Ohio with models being identified as Mark I and Mark ISS.

It will accordingly be understood that there has been disclosed a system and method for providing the sensing of conditions that are instantaneously occurring during injection molding cycles. The signal is obtained by measuring the extent of separation of the mold dies while plastic material is being injected into the cavity. The signal may be employed to reduce the possibility of flash damage to the mold dies by preventing the high clamping force from being exerted on the hardened flash at the parting lines between the dies. Further, either independently of or in conjunction with the mold damage signal, the same or an equivilant signal may be employed as a measure of the pressure of the plastic material in the mold cavity and used to control the rate of flow of the plastic material into the mold cavity.

Variations and modifications may be made within the scope of the claims and portions of the improvements may be used without others.

I claim:

1. The method of providing a control signal in an injection molding cycle for influencing an operation in the cycle comprising the steps of urging a pair of mold dies to a closed position by either a higher or a lower closing force, injecting plastic material under pressure into the closed mold dies while the dies are urged closed by the higher closing force, measuring the extent of the separation of the mold dies caused by the plastic material injection, determining the extent of separation of the dies that enables plastic material to flow between the separated mold dies to form flash, shifting from the higher to the lower closing force if the determined extent of separation is achieved and holding said lower closing force for the remainder of the cycle that the mold dies have a closing force exerted thereon to thereby reduce flash causing deterioration of the mold dies.

2. A plastic injection molding system for providing a signal during a plastic molding cycle for use in effecting control of the cycle comprising a plastic injection molding machine having means for mounting a pair of mold dies for reciprocating movement between an open position and a closed position, means for maintaining either a higher or lower closing force on the mold dies in the closed position of the dies, means for injecting plastic material under pressure into a cavity formed by the closed mold dies with said injecting producing a force tending to open the dies, means for sensing the extent of separation of the mold dies caused by the injection of the plastic material and producing a separation signal related thereto and means for receiving the separation signal and providing a control signal to the closing force maintaining means upon the separation signal attaining a selected value, said closing force maintaining means shifting to said lower closing force upon receipt of said control signal, with said lower closing force being maintained for the remainder of the cycle that the mold dies have a closing force exerted thereon to thereby reduce flash causing deterioration of the mold dies.

3. The invention as defined in claim 2 in which the mold dies are capable of separating to an extent sufficient to enable plastic material to flow into the separation from the cavity and form flash with said sufficient extent causing at least the selected value of the separation signal and in which the receiving means provides the control signal to effect shifting to the lower closing force prior to the mold dies becoming closed to compress the flash.

4. The invention as defined in claim 3 in which the closing force maintaining means shifts immediately to the lower closing force upon receipt of the control signal.

5. The invention as defined in claim 3 in which the closing force maintaining means shifts to the lower closing force a set time after receipt of the control signal.

* * * * *